United States Patent [19]
Enright

[11] Patent Number: 5,945,598
[45] Date of Patent: Aug. 31, 1999

[54] DYNAMOMETER TEST APPARATUS FOR AIRCRAFT BRAKES

[75] Inventor: John J. Enright, Troy, Ohio

[73] Assignee: The B.F. Goodrich Company, Richfield, Ohio

[21] Appl. No.: 08/924,197

[22] Filed: Sep. 5, 1997

[51] Int. Cl.[6] ........................................ G01L 3/02
[52] U.S. Cl. .......................... 73/123; 73/862.29
[58] Field of Search ............... 73/117, 123, 125, 73/130, 862.191, 862.29

[56] References Cited

U.S. PATENT DOCUMENTS

| | | | |
|---|---|---|---|
| 4,092,855 | 6/1978 | Kinney | 73/862.12 |
| 4,182,166 | 1/1980 | Herr, Jr. | 73/862.09 |
| 4,593,557 | 6/1986 | Oblizajek et al. | 73/146 |
| 4,753,110 | 6/1988 | Burchett et al. | 73/146 |
| 4,753,116 | 6/1988 | Burchett | 73/117 |
| 4,958,512 | 9/1990 | Johnsen | 73/146 |
| 5,003,829 | 4/1991 | DeConti et al. | 73/862.12 |
| 5,398,545 | 3/1995 | Blazic et al. | 73/146 |

OTHER PUBLICATIONS

Realistic Evaluation of Airplane Brake Vibration by Laboratory Test and Analysis, by Raymond J. Black, Aircraft Landing Systems, AlliedSignal, Inc. DE–vol. 84–1, 1995 Design Engineering Technical Conferences, vol. 3–Part A, ASME 1995. pp. 1197–1207.

Laboratory Simulation of Landing Gear Pitch–Plane Dynamics (#851937), by John J. Enright, Aerospace Division, BFGoodrich Co., SAE Technical Paper Series, Aerospace Technology Conference & Exposition, Long Beach, CA, Oct. 14–17, 1985, Pp. 1–10.

Brake Dynamics, Aerospace Information Report, AIR 1064, Society of Automotive Engineers, Inc., Mar. 30, 1988. pp. 1–21.

Exhibit E, telefax to The Boeing Company, dated Apr. 11, 1994.

*Primary Examiner*—Richard Chilcot
*Assistant Examiner*—Eric S. McCall
*Attorney, Agent, or Firm*—Kevin L. Leffel

[57] ABSTRACT

The invention is in the field of dynamometer testing of aircraft wheel and brake assemblies and, more particularly, relates to the simulation of brake and landing gear vibration dynamics on a dynamometer. The test apparatus and method according to the invention employ a pitch beam that simulates bogie pitch motion, and a walk beam that simulates landing gear walk.

20 Claims, 5 Drawing Sheets

DYNAMOMETER TEST APPARATUS FOR AIRCRAFT BRAKES

BACKGROUND

The invention is in the field of dynamometer testing of aircraft wheel and brake assemblies and, more particularly, relates to the simulation of brake and landing gear vibration dynamics on a dynamometer.

The aircraft landing gear is by nature a complex multi-degree-of-freedom dynamic system. As such, it may encounter various vibratory modes which can be induced by brake frictional characteristics and design features. Aircraft design specification and industry practices require that these modes be assessed during the design concept state and verified during hardware development. Dynamometer simulation of the landing gear is a desirable way to accomplish the necessary brake/landing gear dynamic assessment since brake testing is routinely accomplished by landing a complete wheel, brake, and tire unit against an inertial roadwheel. The requirements for sufficient gear simulation should include the major system degrees-of-freedom that affect the transient brake/landing gear load dynamics. Brake induced vibration and various techniques for simulating such vibration on a dynamometer are discussed in "Brake Dynamics", Aerospace Information Report (AIR) 1064, the Society of Automotive Engineers, Inc., Mar. 30, 1988; "Laboratory Simulation of Landing Gear Pitch-Plane Dynamics", SAE Technical Paper 851937, presented at the Aerospace Technology Conference & Exposition, October 14–17, 1985; and "Realistic Evaluation of Airplane Brake Vibration by Laboratory Test and Analysis", DE-Vol. 84-1, 1995 Design Engineering Technical Conferences Volume 3 - Part A, ASME 1995.

Though these prior techniques are effective in certain respects, an improved dynamometer test apparatus and method are desired that simulates vibrational coupling between braking and gear walk. A more accurate simulation of the motion of the landing gear strut, bogie beam, wheel and brake assemblies, brake rods, and tires on a dynamometer is desired since motion of these components dictates, in part, the amount of damping generated at their mechanical junctures.

SUMMARY OF THE INVENTION

According to an aspect of the invention, a dynamometer test apparatus is provided, comprising:

a base;

a roadwheel pivot mounted to the base;

a dynamometer roadwheel mounted to the roadwheel pivot, the roadwheel pivot defining a roadwheel axis of rotation;

a pitch beam pivot mounted to the base;

a pitch beam mounted to the pitch beam pivot and having an axle spaced from the pitch beam pivot, the pitch beam pivot defining a pitch beam axis of rotation;

a pitch motion inducer attached to the pitch beam, the pitch motion inducer inducing cyclic rotational movement of the pitch beam around the pitch beam pivot;

an aircraft wheel, tire, and brake assembly mounted to the axle, the aircraft wheel, tire, and brake assembly including a rotor element and a stator element, the rotor element including a tire in contact with the dynamometer road wheel, the stator element having a first brake rod mounting pivot, the axle defining a wheel and brake axis of rotation;

a walk beam pivot mounted to the base;

a walk beam mounted to the walk beam pivot, the walk beam having a second brake rod mounting pivot spaced from the walk beam pivot, the walk beam pivot defining a walk beam axis of rotation;

a walk spring attached to the walk beam and the base, the walk spring cooperating with the walk beam to provide cyclic rotational movement of the walk beam around the walk beam pivot; and, a brake rod having a first end mounted to the first brake rod mounting pivot and a second end mounted to the second brake rod mounting pivot, the first brake rod mounting pivot defining a first brake rod axis of rotation and the second brake rod mounting pivot defining a second brake rod axis of rotation;

wherein the roadwheel pivot axis of rotation, the pitch beam pivot axis of rotation, the wheel and brake axis of rotation, the walk beam axis of rotation, the first brake rod axis of rotation, and the second brake rod axis of rotation are parallel to each other.

According to a further aspect of the invention, a dynamometer test method is provided, comprising the steps of:

rotating a dynamometer road wheel mounted to a roadwheel pivot, the roadwheel pivot defining a roadwheel axis of rotation;

inducing cyclic rotational movement of a pitch beam around a pitch beam pivot having an axle spaced from the pitch beam pivot, an aircraft wheel, tire, and brake assembly being mounted to the axle, the aircraft wheel, tire, and brake assembly including a rotor element and a stator element, the tire being part of the rotor element and being in contact with the roadwheel, the stator element having a first brake rod mounting pivot, the pitch beam pivot defining a pitch beam axis of rotation and the axle defining a wheel and brake axis of rotation; and, inducing cyclic rotational movement of a walk beam around a walk beam pivot having a second brake rod mounting pivot spaced from the walk beam pivot, a brake rod having a first end mounted to the first brake rod mounting pivot and a second end mounted to the second brake rod mounting pivot, the first brake rod mounting pivot defining a first brake rod axis of rotation and the second brake rod mounting pivot defining a second brake rod axis of rotation and the walk beam pivot defining a walk beam axis of rotation, wherein the roadwheel pivot axis of rotation, the pitch beam pivot axis of rotation, the wheel and brake axis of rotation, the walk beam axis of rotation, the first brake rod axis of rotation, and the second brake rod axis of rotation are parallel to each other.

In comparison to prior techniques, the method and apparatus according to the invention provide a more accurate simulation of the motion of the landing gear strut, bogie beam, wheel and brake assemblies, brake rods, and tires on a dynamometer, and thus a more accurate simulation of the damping generated at their mechanical junctures

DETAILED DESCRIPTION

Figure 1:
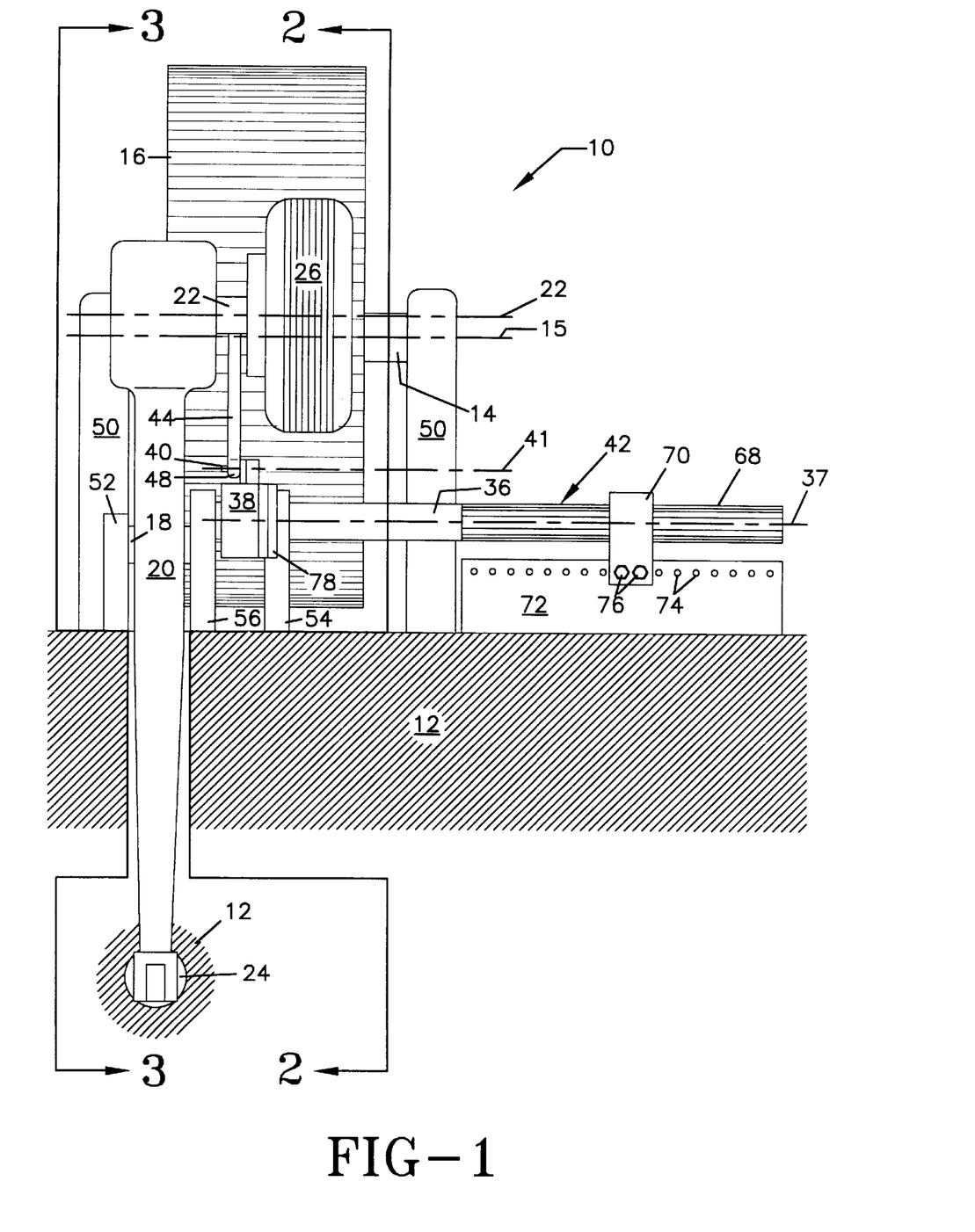
FIG. 1 is a front view of a dynamometer test apparatus according to an aspect of the invention.
Figure 2:
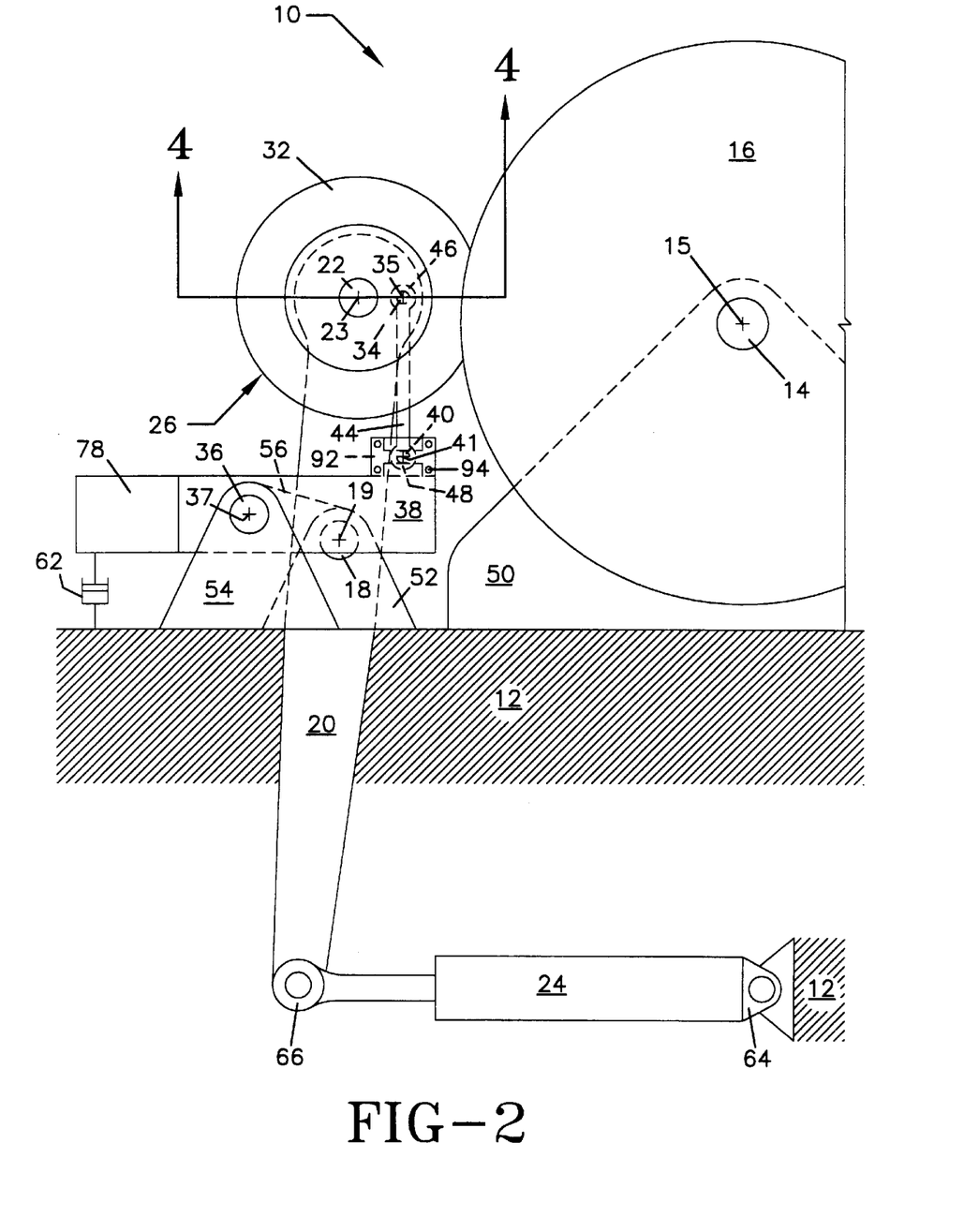
FIG. 2 is a side elevational view of the dynamometer test apparatus along line 2—2 of FIG. 1.
Figure 3:
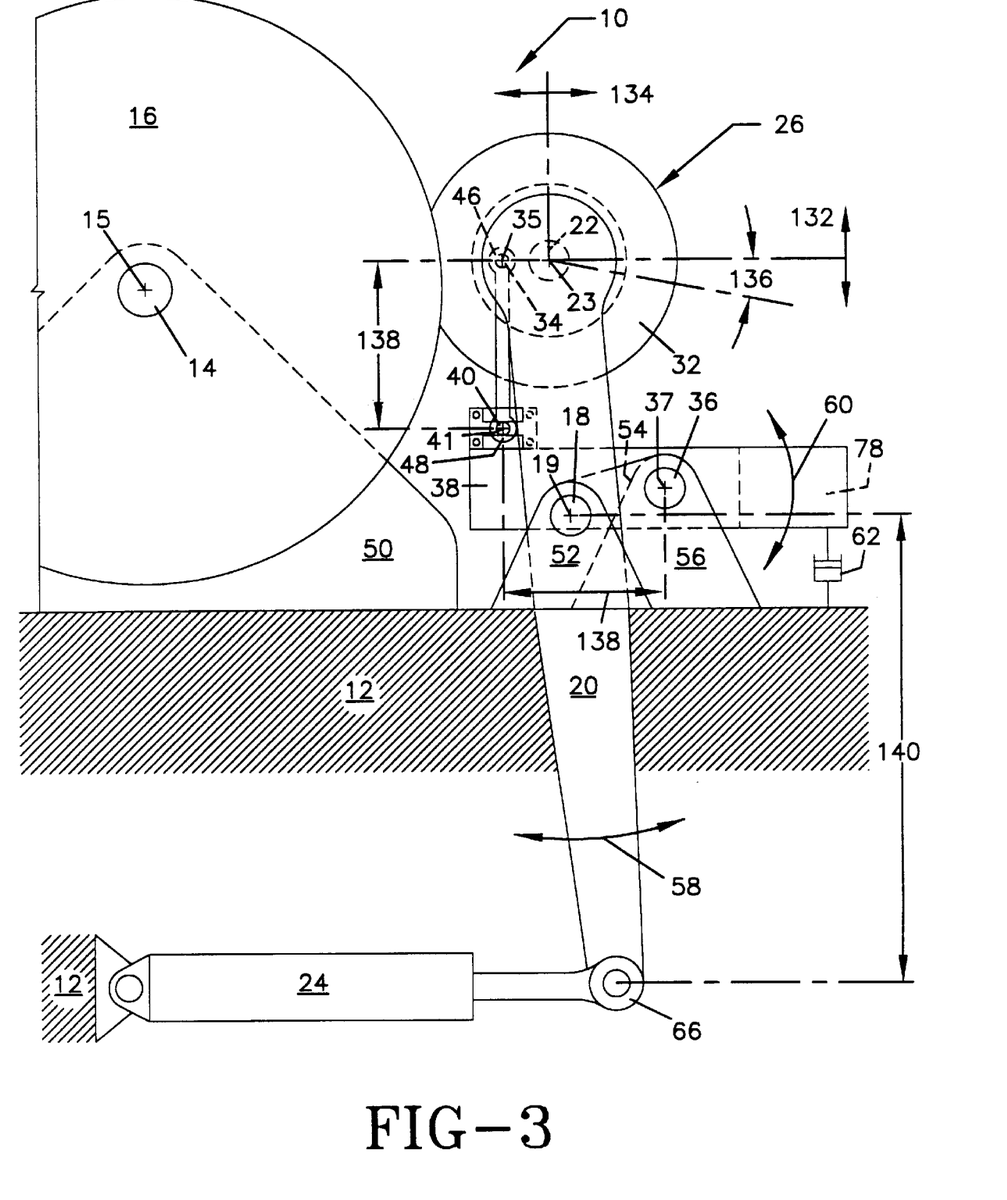
FIG. 3 is a side elevational view of the dynamometer test apparatus along line 3—3 of FIG. 1.

Various aspects of the invention are presented in FIGS. 1–5, which are not to scale, and wherein like components are numbered alike. Referring now to FIGS. 1–3, a dynamometer test apparatus 10 is presented according to an aspect of the invention. FIG. 1 is a front view of the apparatus 10, and FIGS. 2 and 3 are left side and right side elevational views along lines 2—2 and 3—3 of FIG. 1, respectively. In FIGS. 2 and 3, hidden portions of the various components are shown as dashed lines. The dynamometer test apparatus 10 comprises a base 12, a roadwheel pivot 14 mounted to the base 12, and a dynamometer roadwheel 16 mounted to the roadwheel pivot 14. The roadwheel 16 is cylindrical, and part is shown broken away in FIGS. 2 and 3 in order to facilitate depiction of the apparatus 10 within the prescribed area of the drawing sheet. A pitch beam pivot 18 is mounted to the base 12, and a pitch beam 20 is mounted to the pitch beam pivot 18 and has an axle 22 spaced from the pitch beam pivot 18. A pitch motion inducer 24 is provided that induces cyclic rotational movement of the pitch beam 20 around the pitch beam pivot 18, and may be attached to the pitch beam 20. An aircraft wheel, tire, and brake assembly 26 is mounted to the axle 22. As best presented in FIG. 4, the aircraft wheel, tire, and brake assembly 26 includes a rotor element 28 and a stator element 30. The rotor element 28 includes a tire 32 in contact with the dynamometer road wheel 16. The stator element 28 has a first brake rod mounting pivot 34. Referring again to FIGS. 1–3, a walk beam pivot 36 is mounted to the base 12, and a walk beam 38 is mounted to the walk beam pivot 36. The walk beam 38 has a second brake rod mounting pivot 40 spaced from the walk beam pivot 36. A walk spring 42 is attached to the walk beam 38 and the base 12. As will be described more fully, the walk spring 42 cooperates with the walk beam 38 to provide cyclic rotational movement of the walk beam 38 around the walk beam pivot 36. A brake rod 44 having a first end 46 mounted to the first brake rod mounting pivot 34 and a second end 48 mounted to the second brake rod mounting pivot 40. The roadwheel pivot 14 defines a roadwheel axis of rotation 15, the pitch beam pivot 18 defines a pitch beam axis of rotation 19, the axle 22 defines a wheel and brake axis of rotation 23, the walk beam pivot 36 defines a walk beam axis of rotation 37, the first brake rod mounting pivot 34 defining a first brake rod axis of rotation 35, and the second brake rod mounting pivot 40 defines a second brake rod axis of rotation 41. Each of these axes of rotation 15, 19, 23, 37, 35 and 41 are parallel to each other. As used herein, the term "cyclic rotational movement" of a beam around a pivot means that the beam repeatedly rotates back and forth around the pivot a fraction of a revolution, as indicated by arrows 58 and 60 of FIG. 3. The magnitudes of the movements suggested by arrows 58 and 60 is greatly exaggerated in FIG. 3.

The base 12 is preferably a large stationary mass, and may comprise a roadwheel frame 50 to which the roadwheel pivot 14 is attached, a pitch beam mounting pedestal 52 to which the pitch beam 20 is attached, and a walk beam mounting pedestal 54 to which the walk beam 38 is attached. In the embodiment presented in FIGS. 1–3, the pitch beam mounting pedestal and walk beam mounting pedestal between the walk beam 38 and pitch beam 20 are formed as a combined pedestal 56. Frictional resistance to rotation of the various components is preferably minimized, and bearings may be provided to mount each pivot. The mounting arrangement presented in FIGS. 1–3 is intended to be schematic in nature, and is greatly simplified in order to facilitate explanation of the invention, such considerations being well within the ordinary skill of an artisan in the art of mechanical design. The actual mounting configuration may vary greatly depending upon the particular facility into which the apparatus 10 is installed, and It is not intended to limit the invention to the specific mounting arrangement presented in FIGS. 1–3.

Referring to FIGS. 2–3, a damping device 62 may be attached to the walk beam 38 that damps the cyclic rotational movement of the walk beam. The damping device may take various forms including, without limitation, linear viscous, hydraulic, impact clearances, and coulomb damping, alone or in combination. Any type of damping may be employed as may be desired to simulate actual walk damping in an aircraft landing gear.

The pitch motion inducer 24 may take various forms. For example, the pitch motion inducer 24 may be comprised of an actuator that forces the pitch beam 20 to move in a prescribed manner, or a pitch spring that cooperates with the mass of the pitch beam 20 to provide cyclic rotational movement of the pitch beam 20 about the pitch beam pivot 18 at a dynamometer pitch natural frequency, along with means for inducing pitch motion, since a natural excitation of this mode may not otherwise occur in apparatus 10. Bumps or roughness may be provided on the surface of the roadwheel for this purpose, thus simulating runway roughness. Potentially suitable pitch springs include, without limitation, pneumatic springs, hydraulic springs, coil springs, leaf springs, and torsional shaft or spiral springs. As shown in FIGS. 1–3, the pitch motion inducer 24 is a pneumatic or hydraulic cylinder actuator having one end 64 attached to the base 12 and an opposing end 66 attached to the pitch beam 20 spaced from the pitch beam pivot 18 in a manner that permits relative rotation between the pitch beam 20 and the end 66. Movement of the pitch beam 20 may be driven at a desired frequency by an electric motor mounted to the pitch beam 20 that rotationally drives an eccentric mass, or by cyclicly actuating the cylinder 24 back and forth with suitable valving, or by an equivalent method. Any of these methods may also be employed to excite pitch movement at the natural pitch frequency if a pitch spring is employed. According to a preferred embodiment, the cylinder 24 is sized such that it provides a desired spring rate and acts as a pitch spring, and the cylinder 24 is also used to excite the pitch movement by cyclicly actuating the cylinder 24 back and forth. Thus, various configurations may be employed for inducing pitch motion, and it is not intended to limit the invention to any particular configuration for achieving this function. If a pitch spring is employed, a damping device may be attached to the pitch beam 20 that damps the cyclic rotational movement of the pitch beam. The damping device may take various forms including, without limitation, linear viscous, hydraulic, impact clearances, and coulomb damping, alone or in combination. Any type of damping may be employed as may be desired to simulate actual pitch damping in an aircraft landing gear.

The wheel, tire, and brake assembly 26 is forced against the roadwheel by a suitable mechanism in order to simulate aircraft weight acting upon the assembly 26 in actual service. For example, the pitch beam 20 and walk beam 38 might both be mounted on a carriage that is translatable toward and away from the roadwheel 16, or just pitch beam 20 may be mounted on a carriage that is translatable toward and away from the roadwheel 16 with the walk beam 38 fixed relative to the roadwheel 16, or the pitch beam 20 and walk beam 38 might be fixed relative to the base 12 with the roadwheel 16 being mounted on a carriage that is translatable toward and away from the pitch beam 20 and walk beam 38. According to a preferred embodiment, the configuration of FIGS. 2 and 3 is employed wherein the pitch motion inducer 24 forces the wheel, tire, and brake assembly 26 against the road wheel 16 with an average load that simulates an aircraft weight per individual wheel and brake and assembly 26, and upon which the cyclic rotational movement of the pitch beam 20 is superimposed. The wheel, tire, and brake assembly 26 may be lifted from the roadwheel by rotating the pitch beam 20, thus enabling change out and testing of different such assemblies.

The walk beam 38 has a mass, and the walk spring 42 cooperates with the walk beam 38, more particularly its mass, to provide cyclic rotational movement of the walk beam 38 around the walk beam pivot 36 at a dynamometer walk natural frequency. The walk spring 42 may take various forms. As presented in FIG. 1, the walk spring 42 may comprise a torsional spring 68 attached to the walk beam 38, however, the walk spring may comprise any form of an elastic restraint of the walk beam 38 and need not be mechanical or torsional. Potentially suitable walk springs include, without limitation, pneumatic springs, hydraulic springs, coil springs, leaf springs, and spiral springs. In the embodiment presented, the torsional spring 68 is a splined shaft having a mating splined bushing 70. The splined bushing 70 is fixed to a spring reaction mount 72 which, in turn, is fixed to the base 12. The splined bushing 70 is preferably moveable along the length of the spring reaction mount 72 in order to vary the spring rate, and thus the dynamometer walk natural frequency. In the example presented in FIG. 1, the spring reaction mount 72 is be provided with a series of holes 74 that mate holes in the splined bushing 70, and through which fasteners 76 are passed. One or more plates 78 may also be attached to the walk beam 38 to adjust the walk beam mass, thus providing another degree of freedom for varying the dynamometer walk natural frequency. It is evident that the spring rate of walk spring 42 and/or mass of the walk beam 38 may be adjusted in various ways to achieve a desired walk beam natural frequency, and it is not intended to limit the invention to any particular configuration in this respect.

Figure 4:
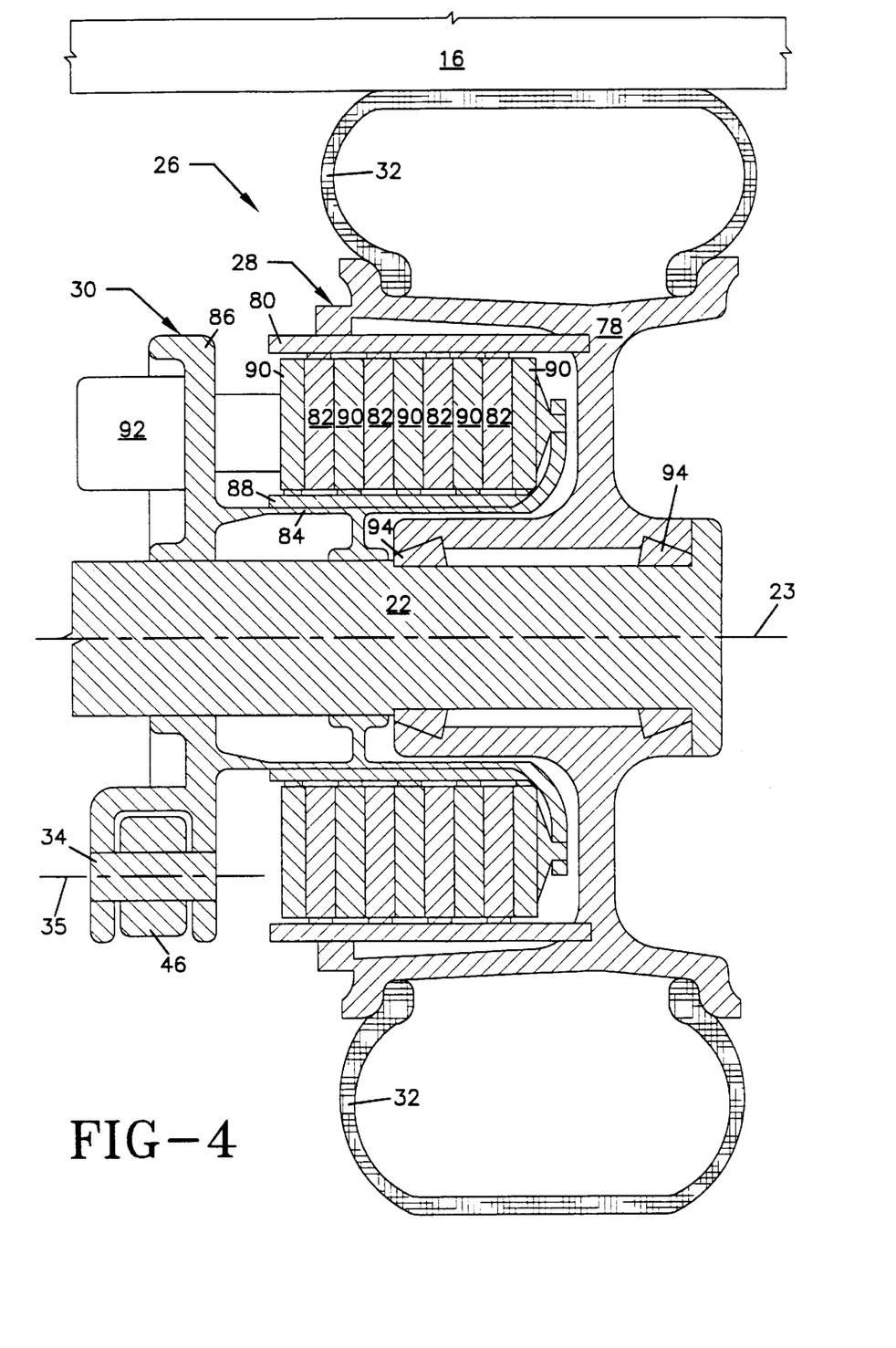
FIG. 4 is a cross-sectional view of a wheel, tire, and brake assembly along line 4—4 of FIG. 2.

Referring now to FIG. 4, a cross-sectional view of the wheel, tire, and brake assembly 26 along line 4—4 of FIG. 2 is presented. The rotor element 28 comprises a rim 78 to which the tire 32 is attached in known manner. A multitude of torque bars 80 are fixed to the rim 78 and spaced around its circumference, and a multitude of stator disks 82 have mating slots that engage the torque bars 80 and force the rotor disks 82 to rotate with the rim 78, but permit the rotor disks 82 to slide along the torque bars 80. The stator element comprises a torque tube 84 fixed to a reaction member 86. The torque tube 84 is provided with a multitude of splines 88 spaced around its outer circumference, and a multitude of stator disks 90 having mating slots that engage the splines 88 and prevent rotation of the stator disks 90 relative to the torque tube 84 and reaction member 86, but permit the stator disks 90 to slide along the splines 88. An actuator 92 is provided that forces the stator disks 90 against the rotor disks 82 thereby generating a braking torque upon the rim 78 an tire 32. The actuator 92 may take various forms, including hydraulic and electromechanical actuators. A multitude of such actuators may be spaced around the circumference of the reaction member 86, as may be required for a particular application. Tapered roller bearings 94 are provided between the rim 78 and the axle 22. The configuration and operation of aircraft wheel and brake assemblies is very well known in the art, and it is not intended to restrict the invention to any particular configuration since the apparatus 10 may be employed to test brake performance in many types of wheel and brake assemblies.

Figure 5:
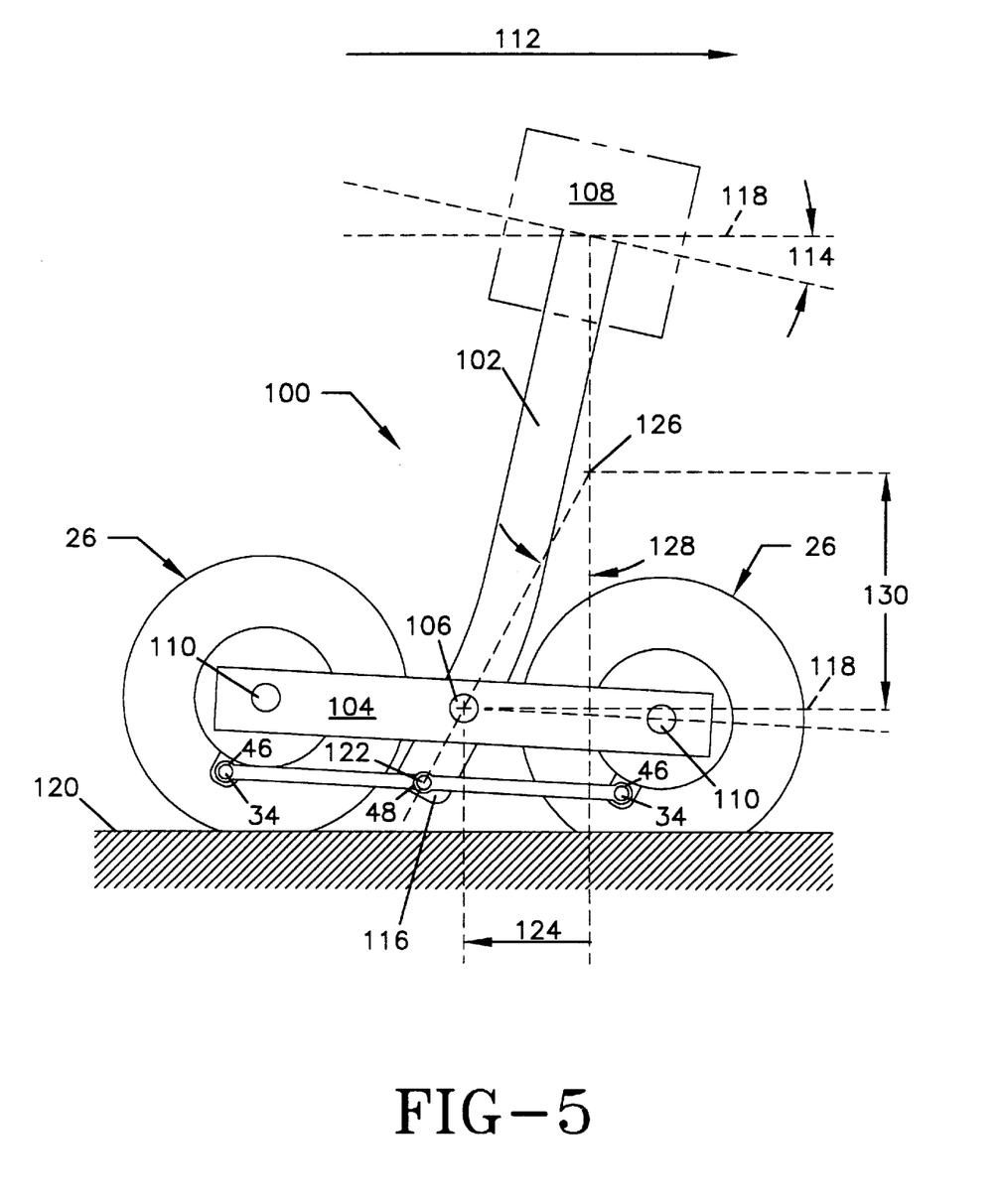
FIG. 5 is schematic view of an aircraft landing gear.

According to an aspect of the invention, the apparatus 10 may be employed to evaluate brake performance with simulated landing gear walk and aircraft bogie pitch during braking. Gear walk is a fore and aft (relative to the aircraft) oscillation, of the landing gear that can be induced by braking friction. Bogie pitch is a vertical (relative to the aircraft) oscillation of the landing gear bogie beam about its pivot point induced by runway roughness or irregularities. Referring now to FIG. 5, a schematic of an aircraft landing gear 100 is presented. Landing gear 100 comprises a strut 102, and a bogie 104 mounted to the strut 102 at a bogie pivot 106. A horizontal plane 118 is presented as a reference frame. As depicted in FIG. 5, gear walk is a combination of rotation of the strut 102, induced by wing twist 114, and bending of the strut 102. Bogie pitch is caused rotation of the bogie 104 relative to the horizontal plane. The landing gear 100 is attached to an aircraft (not shown) that is represented by a dynamic mass 108, which is the aircraft mass participating in the gear mode. Wheel and brake assemblies 26 are attached to axles 110 that are fixed to the bogie 104. The aircraft and landing gear 100 are shown as landed on a runway 120, and are moving in the direction of arrow 112 when the brakes are activated. A portion of the strut 102 referred to herein as a fork 116 extends below the bogie 104. Brake rods 44 are attached to the fork 116 and the stator portion of each wheel, tire, and brake assembly 26 at the first brake rod mounting pivot 34, and at a bogie brake rod mounting pivot 122, in the same manner as described in relation to FIGS. 1–3. The brake rods 44 in combination with the fork 116 act as reaction members that counteract the braking torque developed by the brakes and acting around the axles 110.

As noted in SAE Technical Paper 851937, entitled "Laboratory Simulation of Landing Gear Pitch-Plane Dynamics", published in 1985, a differential equation that described the dynamic motion of an aircraft landing gear and wheel and brake assembly may be developed using normal mode analysis. The analysis presented in that paper shows that a differential equation may be derived that represents the normal mode dynamic response of the four braked bogie system presented in FIG. 5, as follows:

$$M_L \ddot{x} + C_L \dot{x} + K_L x = 4\left(\frac{L+R}{Lr}\right)T \qquad \text{Eqn. (1)}$$

where $$C_L = 2\zeta_L \sqrt{K_L M_L} \qquad \text{Eqn. (2)}$$

wherein $M_L$ is the landed gear walk mass for the landing gear walk mode being analyzed, $C_L$ is the landed gear walk damping coefficient, $K_L$ is the dynamic fore-aft stiffness of the landed system, $\zeta_L$ is the landed gear walk damping ratio, x is the fore-aft displacement 124, L is the effective rigid strut length 130 defined as the ratio between the angular and fore-aft deflections of the axle, r is the static loaded radius of the tire under load N, T is the torque generated by an individual brake, R is the rolling radius of the tire under load N, and N is the load per tire in the vertical direction. Non-linear and second order terms are assumed negligible in deriving Equation 1.

Assuming that torque is a function of relative speed between the rotors and stators, Equation 4 is transformed as follows:

$$M_L \frac{\lambda_r \lambda_R}{4}\left(\frac{\ddot{x}}{\lambda_R}\right) + \left(C_L \frac{\lambda_r \lambda_R}{4} + S\right)\left(\frac{\dot{x}}{\lambda_R}\right) + K_L \frac{\lambda_r \lambda_R}{4}\left(\frac{x}{\lambda_R}\right) = \bar{T} \quad \text{Eqn. (3)}$$

where $$\lambda_R = \frac{LR}{L+R} \quad \text{Eqn. (4)}$$

$$S = \frac{\partial T}{\partial \Omega} \quad \text{Eqn. (5)}$$

$$\lambda_r = \frac{Lr}{L+r} \quad \text{Eqn. (6)}$$

wherein T is the mean value of torque generated by the brake at any particular operating point, $\partial T/\partial \Omega$ is the operating point value of the derivative of torque with respect to rotational speed.

The landed gear walk natural frequency is:

$$f_L = \frac{1}{2\pi}\sqrt{\frac{K_L}{M_L}} \quad \text{Eqn. (7)}$$

and the criteria for stability is:

$$S > -C_L \frac{\lambda_r \lambda_R}{4} \quad \text{Eqn. (8)}$$

The landed dynamic pitch response of the system presented in FIG. 5 is as follows:

$$\left(\frac{I_B}{4L_B^2}\right)\ddot{y} + c\dot{y} + ky = 0 \quad \text{Eqn. (9)}$$

wherein $I_B$ is the mass moment of inertia of the bogie beam about its pivot point, including all non-rotating brake parts and brake rods, LB is the half length of the bogie beam from bogie pivot to axle center, k is the radial stiffness of the tire at load N, and c is the damping coefficient associated with k. The landed pitch natural frequency is:

$$f_B = \frac{L_B}{\pi}\sqrt{\frac{k}{I_B}} \quad \text{Eqn. (10)}$$

Thus, the landed dynamic walk response of the system presented in FIG. 5 may be approximated by the linear differential Equation 8, and the landed dynamic pitch response may be approximated by the linear differential Equation 14. Similar equations may be developed for other systems, including without limitation, for example, a bogie beam have six wheel and brake assemblies or a selective braking system as described in U.S. Pat. Nos. 4,923,056 and 4,986,610.

With apparatus 10, gear walk may be simulated by cyclic rotation of the walk beam 38 which causes a periodic vertical displacement 132 of the wheel, tire, and brake assembly 26. Bogie pitch may be simulated by cyclic rotation of the pitch beam 20 which causes a periodic horizontal displacement 134 of the wheel, tire, and brake assembly 26. Making the same assumptions as already noted, where applicable, the equation for dynamometer walk is:

$$I_D\ddot{\beta} + (C_D + S)\dot{\beta} + K_D\beta = \bar{T} \quad \text{Eqn. (11)}$$

where $$I_D = I_S + I_W\left(\frac{h}{L_W}\right)^2 \quad \text{Eqn. (12)}$$

$$K_D = K_W\left(\frac{h}{L_W}\right)^2 \quad \text{Eqn. (13)}$$

$$C_D = 2\zeta_D\sqrt{K_D I_D} \quad \text{Eqn. (14)}$$

wherein $\beta$ is the angular rotation of the stator portion of the wheel, tire, and brake assembly 26 as indicated at 136 in FIG. 3, $I_D$ is the dynamometer walk mode inertia, $I_S$ is the mass moment of inertia of non-rotating parts (relative to the axle) moment brake about the axle center, $l_W$ is the mass moment inertia of the walk beam 38 about its pivot, including the mass of the brake rod acting at the rod bushing, but not its mass moment of inertia, h is the horizontal distance between the wheel and brake axis of rotation 23 and the first brake rod axis of rotation 35, $L_w$ is the horizontal distance between the walk beam pivot 36 and the second brake rod mounting pivot 40 as indicated at 138 in FIG. 3, $K_D$ is the dynamometer walk mode stiffness, $K_w$ is the stiffness of the walk spring 42, and $\zeta_D$ is the unbraked dynamometer walk mode damping ratio.

The dynamometer walk mode natural frequency is:

$$f_D = \frac{1}{2\pi}\sqrt{\frac{K_D}{I_D}} \quad \text{Eqn. (15)}$$

and the stability criterion is:

$$S > -C_D \quad \text{Eqn. (16)}$$

The equation for dynamometer pitch is:

$$\left(\frac{I_P}{L_1^2}\right)\ddot{y} + \left[k + k_2\left(\frac{L_2}{L_1}\right)^2\right]y = 0 \quad \text{Eqn. (17)}$$

wherein $I_p$ is the mass moment of inertia of the pitch beam 20 about its pivot, including the mass effect of the wheel, tire, and rotors of one brake about the axle center, $k_2$ is the stiffness of the pitch spring acting on the pitch beam 20, $L_1$ is the vertical distance between the pitch beam pivot 18 and the first brake rod mounting pivot 34, indicated at 140 in FIG. 3, $L_2$ is the distance between the pitch beam pivot 18 and the point at which the pitch spring (or actuator) attaches to the pitch beam 20 at 66, indicated at 142 in FIG. 3.

The dynamometer gear walk simulates the landed gear walk of FIG. 5 if the following equations are satisfied:

$$K_D = K_L \frac{\lambda_r \lambda_R}{4} \quad \text{Eqn. (18)}$$

$$I_D = M_L \frac{\lambda_r \lambda_R}{4} \quad \text{Eqn. (19)}$$

$$C_D = C_L \frac{\lambda_r \lambda_R}{4} \quad \text{Eqn. (20)}$$

Thus, the various components of the apparatus 10 may be configured to satisfy Equations 18 through 20 and may be employed to simulate landing gear walk on a dynamometer, and landing gear walk upon brake stability. The dynamometer walk mode angle β is proportional to the gear walk mode translation x as follows:

$$\beta = \frac{x}{\lambda_R} \quad \text{Eqn. (21)}$$

Bogie pitch may also be simulated. The dynamometer pitch mode frequency is equal to the bogie pitch frequency if:

$$k_2 = k\left[4\frac{I_P}{I_B}\left(\frac{L_B}{L_2}\right)^2 - \left(\frac{L_1}{L_2}\right)^2\right] \quad \text{Eqn. (22)}$$

Thus, the various components of the apparatus 10 may be configured to satisfy Equations 18 through 20 and 22, and apparatus 10 may be employed to simultaneously simulate landing gear walk and pitch on a dynamometer, and the effects landing gear walk and pitch on brake stability. For example, if h=L$_w$, then the Boeing 757 landing gear is simulated with a spring rate of 1 million inch-pounds per radian, and the inertia of the beam is sized to provide a walk frequency of 6.2 Hz.

Referring again to FIG. 2, the second brake rod mounting pivot 40 is fixed to the walk beam 38 via a flexible mount 92. In the example presented, the flexible mount 92 comprising an H-shaped plate that is mounted to the walk beam 38 by four fasteners 94. The four point mounting arrangement allows the plate to flex in a prescribed manner. Various configurations are possible, depending on the spring characteristics desired at the flexible mount 92. According to a preferred embodiment, the flexible mount 92 simulates stiffness of the fork 116 of FIG. 5 in various modes of brake vibration. For example, in certain vibration modes, the stator portions of the wheel, tire, and brake assemblies 26 are cyclicly rotating in phase in the same direction resulting in a relatively low effective stiffness at the fork 116, and in other vibration modes, the stator portions of the wheel, tire, and brake assemblies 26 are cyclicly rotating out of phase with each other in the opposite direction resulting in a relatively high effective stiffness at the fork 116. Thus, stiffness effects at the fork 116 induced by different modes of brake vibration may be simulated on the dynamometer using a single wheel, tire, and brake assembly 26.

According to a further aspect of the invention, a dynamometer test method is provided that preferably employs the apparatus 10 previously described in relation to FIGS. 1–5, and may employ any method previously described in relation to those figures. The method according to the invention comprises the steps of rotating a dynamometer road wheel 16 mounted to a roadwheel pivot 14, the roadwheel pivot 14 defining a roadwheel axis of rotation 15; inducing cyclic rotational movement of a pitch beam 20 around a pitch beam pivot 18 having an axle 22 spaced from the pitch beam pivot 18, an aircraft wheel, tire, and brake assembly 26 being mounted to the axle 22, the aircraft wheel, tire, and brake assembly 26 including a rotor element 28 and a stator element 30, the tire 32 being part of the rotor element 28 and in contact with the roadwheel 16, the stator element 30 having a first brake rod mounting pivot 34, the pitch beam pivot 18 defining a pitch beam axis of rotation 19 and the axle 22 defining a wheel and brake axis of rotation 23; and, inducing cyclic rotational movement of a walk beam 38 around a walk beam pivot 36 having a second brake rod mounting pivot 40 spaced from the walk beam pivot 36, a brake rod 44 having a first end 46 mounted to the first brake rod mounting pivot 34 and a second end 48 mounted to the second brake rod mounting pivot 40, the first brake rod mounting pivot 34 defining a first brake rod axis of rotation 35 and the second brake rod mounting pivot 40 defining a second brake rod axis of rotation 41 and the walk beam pivot 36 defining a walk beam axis of rotation 37, wherein the roadwheel pivot axis of rotation 15, the pitch beam pivot axis of rotation 19, the wheel and brake axis of rotation 23, the walk beam axis of rotation 37, the first brake rod axis of rotation 35, and the second brake rod axis of rotation 41 are parallel to each other. According to the method, landing gear walk can be induced by braking friction, thus simulating the aircraft, and coupling between gear walk and braking friction may be simulated.

The method may also further comprise the step of inducing cyclic rotational movement of the pitch beam 20 around the pitch beam pivot 18 at a frequency that simulates aircraft bogie pitch during braking, and the cyclic rotation of the walk beam 18 may occur at a frequency that simulates landing gear walk during braking. As previously described, the stator element 30 may comprise a plurality of stator brake disks 90 and the rotor element 28 may comprise a plurality of rotor brake disks 82 interleaved with the stator brake disks 90, and the method may further comprise the step of forcing the stator brake disks 90 against the rotor brake disks 82. The walk spring 42 cooperates with the walk beam 18, and more particularly its mass, to provide cyclic rotational movement of the walk beam 38 around the walk beam pivot 36. The cyclic rotational movement of the pitch beam 20 around the pitch beam pivot 18 may be induced by forcing the pitch beam 20 to move at a forced pitch frequency, or by roadwheel irregularities, or by an equivalent method.

It is evident that many variations are possible without departing from the true scope and spirit of the invention as defined by the claims that follow.

I claim:

1. A dynamometer test apparatus, comprising:

a base;

a roadwheel pivot mounted to said base;

a dynamometer roadwheel mounted to said roadwheel pivot, said roadwheel pivot defining a roadwheel axis of rotation;

a pitch beam pivot mounted to said base;

a pitch beam mounted to said pitch beam pivot and having an axle spaced from said pitch beam pivot, said pitch beam pivot defining a pitch beam axis of rotation;

a pitch motion inducer that induces cyclic rotational movement of said pitch beam around said pitch beam pivot;

an aircraft wheel, tire, and brake assembly mounted to said axle, said aircraft wheel, tire, and brake assembly including a rotor element and a stator element, said rotor element including a tire in contact with said dynamometer road wheel, said stator element having a first brake rod mounting pivot, said axle defining a wheel and brake axis of rotation;

a walk beam pivot mounted to said base;

a walk beam mounted to said walk beam pivot, said walk beam having a second brake rod mounting pivot spaced from said walk beam pivot, said walk beam pivot defining a walk beam axis of rotation;

a walk spring attached to said walk beam and said base, said walk spring cooperating with said walk beam to provide cyclic rotational movement of said walk beam around said walk beam pivot; and, a brake rod having a first end mounted to said first brake rod mounting pivot and a second end mounted to said second brake rod mounting pivot, said first brake rod mounting pivot defining a first brake rod axis of rotation and said second brake rod mounting pivot defining a second brake rod axis of rotation;

wherein said roadwheel pivot axis of rotation, said pitch beam pivot axis of rotation, said wheel and brake axis of rotation, said walk beam axis of rotation, said first brake rod axis of rotation, and said second brake rod axis of rotation are parallel to each other.

2. The apparatus of claim 1, wherein said cyclic rotational movement of said walk beam simulates aircraft landing gear walk during braking.

3. The apparatus of claim 1, wherein said walk spring said walk spring cooperates with said walk beam to provide cyclic rotational movement of said walk beam around said walk beam pivot at a dynamometer walk natural frequency that simulates aircraft landing gear walk during braking.

4. The apparatus of claim 1, wherein said cyclic rotational movement of said pitch beam simulates aircraft bogie pitch during braking.

5. The apparatus of claim 1, further comprising a pitch spring attached to said pitch beam, said pitch spring cooperating with said pitch beam to provide cyclic rotational movement of said pitch beam around said pitch beam pivot at a dynamometer pitch natural frequency that simulates aircraft bogie pitch during braking.

6. The apparatus of claim 1, wherein said pitch motion inducer comprises an electric motor eccentrically driving a mass.

7. The apparatus of claim 1, wherein said pitch motion inducer comprises a hydraulic cylinder having one end attached to said base and an opposing end attached to said pitch beam spaced from said pitch beam pivot.

8. The apparatus of claim 1, further comprising a damping device attached to said walk beam that damps said cyclic rotational movement of said walk beam.

9. The apparatus of claim 1, wherein said cyclic rotational movement of said walk beam simulates aircraft landing gear walk during braking, and said cyclic rotational movement of said pitch beam simulates aircraft bogie pitch during braking.

10. The apparatus of claim 1, wherein said pitch motion inducer forces said wheel, tire, and brake assembly against said road wheel with an average load that simulates an aircraft weight per individual wheel, tire, and brake assembly, and upon which said cyclic rotational movement of said pitch beam is superimposed.

11. A dynamometer test method, comprising the steps of:

rotating a dynamometer road wheel mounted to a roadwheel pivot, said roadwheel pivot defining a roadwheel axis of rotation;

inducing cyclic rotational movement of a pitch beam around a pitch beam pivot having an axle spaced from said pitch beam pivot, an aircraft wheel, tire, and brake assembly being mounted to said axle, said aircraft wheel, tire, and brake assembly including a rotor element and a stator element, said tire being part of said rotor element and being in contact with said roadwheel, said stator element having a first brake rod mounting pivot, said pitch beam pivot defining a pitch beam axis of rotation and said axle defining a wheel and brake axis of rotation; and, inducing cyclic rotational movement of a walk beam around a walk beam pivot having a second brake rod mounting pivot spaced from said walk beam pivot, a brake rod having a first end mounted to said first brake rod mounting pivot and a second end mounted to said second brake rod mounting pivot, said first brake rod mounting pivot defining a first brake rod axis of rotation and said second brake rod mounting pivot defining a second brake rod axis of rotation and said walk beam pivot defining a walk beam axis of rotation, wherein said roadwheel pivot axis of rotation, said pitch beam pivot axis of rotation, said wheel and brake axis of rotation, said walk beam axis of rotation, said first brake rod axis of rotation, and said second brake rod axis of rotation are parallel to each other.

12. The method of claim 11, wherein said stator element comprises a plurality of stator brake disks and said rotor element comprises a plurality of rotor brake disks interleaved with said stator brake disks, and further comprising the step of forcing said stator brake disks against said rotor brake disks.

13. The method of claim 11, further comprising the step of inducing cyclic rotational movement of said walk beam around said walk beam pivot at a frequency that simulates aircraft landing gear walk during braking.

14. The method of claim 11, further comprising the step of inducing cyclic rotational movement of said pitch beam around said pitch beam pivot at a frequency that simulates aircraft bogie pitch during braking.

15. The method of claim 11, wherein a walk spring cooperates with said walk beam to provide cyclic rotational movement of said walk beam around said walk beam pivot.

16. The method of claim 11, wherein said cyclic rotational movement of said pitch beam around said pitch beam pivot is induced by forcing said pitch beam to move at a forced pitch frequency.

17. The method of claim 11, further comprising the steps of:

inducing cyclic rotational movement of said walk beam around said walk beam pivot at a frequency that simulates aircraft landing gear walk during braking;

inducing cyclic rotational movement of said pitch beam around said pitch beam pivot at a frequency that simulates aircraft bogie pitch during braking.

18. The apparatus of claim 11, further comprising a damping device attached to said walk beam that damps said cyclic rotational movement of said walk beam.

19. The apparatus of claim 1, further comprising the step of forcing said wheel, tire, and brake assembly against said road wheel with an average load that simulates an aircraft weight per individual wheel and brake and assembly, and upon which said cyclic rotational movement of said pitch beam is superimposed.

20. The method of claim 11, wherein said cyclic rotational movement of said pitch beam around said pitch beam pivot is induced by forcing said pitch beam to move at a forced pitch frequency, and wherein a walk spring cooperates with said walk beam to provide cyclic rotational movement of said walk beam around said walk beam pivot at a frequency that simulates aircraft landing gear walk during braking.

* * * * *